Figure 1:
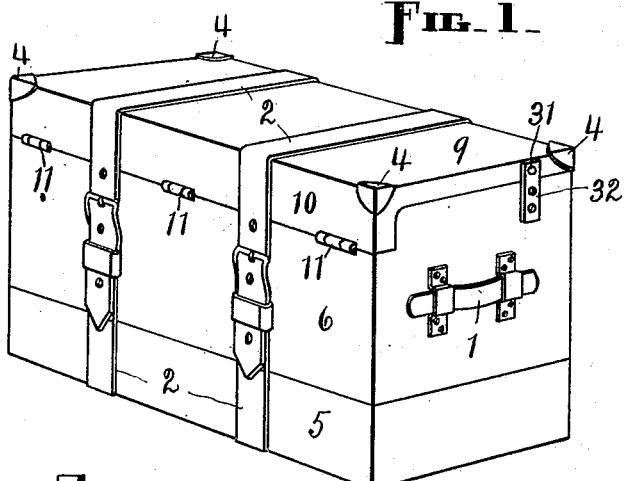

H. McLEOD.
COMBINED TRUNK AND SEAT.
APPLICATION FILED JUNE 30, 1911.

1,124,769.

Patented Jan. 12, 1915.

2 SHEETS—SHEET 1.

WITNESSES:
A. C. Fairbanks.
J. M. Davenport.

INVENTOR.
Hugh McLeod,
BY
Webster & Co.
ATTORNEYS.

THE NORRIS PETERS CO., PHOTO-LITHO., WASHINGTON, D. C.

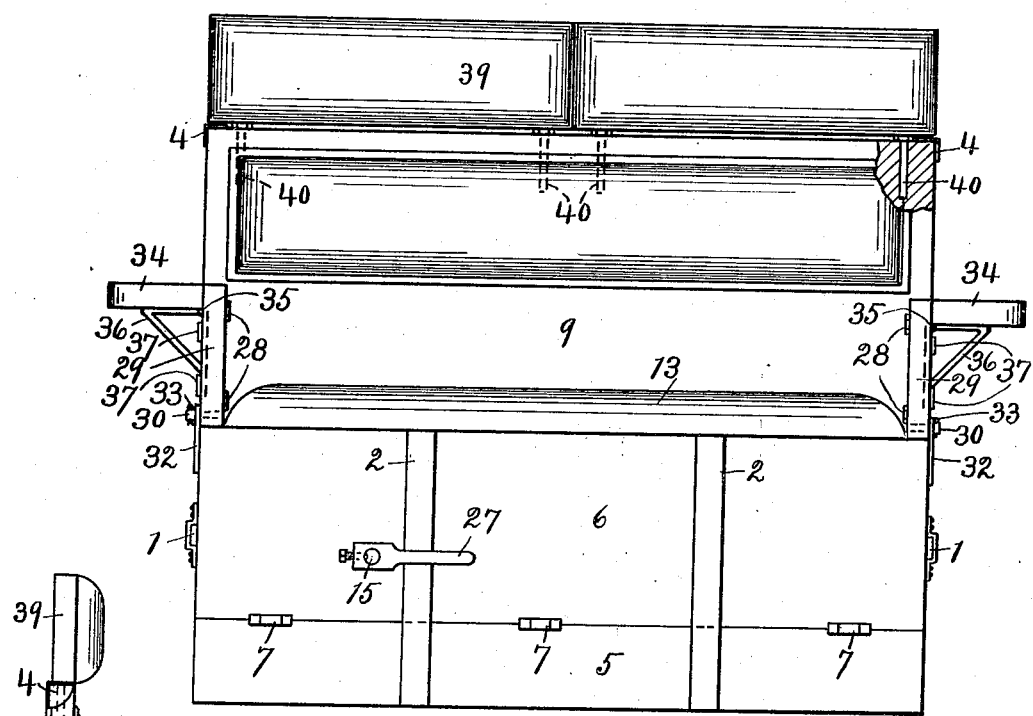
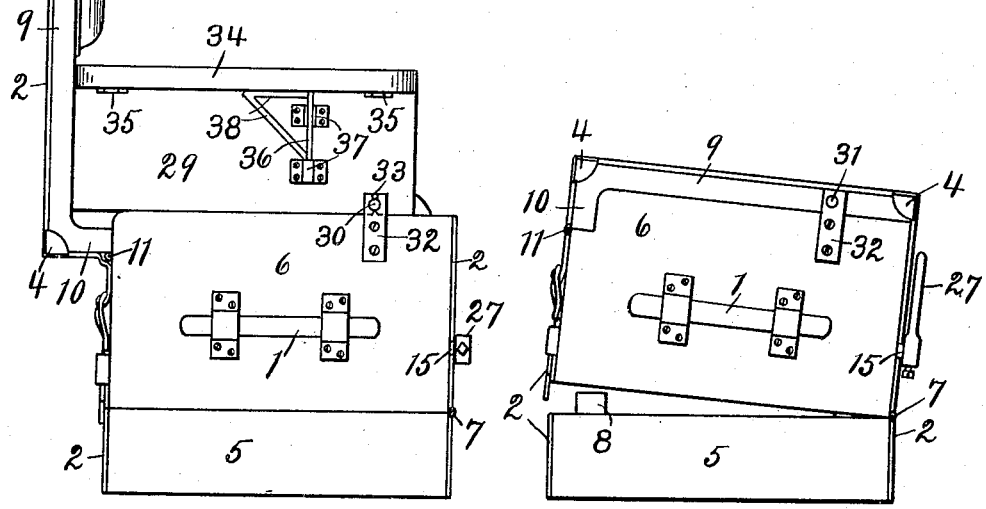

UNITED STATES PATENT OFFICE.

HUGH McLEOD, OF HATFIELD, MASSACHUSETTS.

COMBINED TRUNK AND SEAT.

1,124,769.  Specification of Letters Patent.  Patented Jan. 12, 1915.

Application filed June 30, 1911. Serial No. 636,197.

*To all whom it may concern:*

Be it known that I, HUGH McLEOD, a citizen of the United States of America, residing at Hatfield, in the county of Hampshire and State of Massachusetts, have invented a new and useful Combined Trunk and Seat, of which the following is a specification.

My invention relates to improvements in seats of the convertible type, and takes the form of a combination chest, box or trunk and seat, or of a chest, box or trunk that can be changed to a seat, and back again into a chest, box or trunk, the same being particularly designed and intended for use in connection with automobiles.

Said invention comprises a certain peculiar box-like receptacle, which preferably simulates a trunk in external appearance, and the lower portion of which is designed to be permanently secured to the floor of an automobile, seat-forming members attached to or connected or associated with such receptacle and practically constituting constituent parts thereof, and mechanism for supporting the seat proper in either of two positions, together with such subsidiary and auxiliary elements or members as may be needed to render the invention complete, said seat-forming members being receivable in said receptacle, and said mechanism being operable from outside of the receptacle, all as hereinafter set forth.

The object of my invention is to provide for an automobile body a convertible receptacle so constructed that, while always ready for use and serviceable in its capacity as a receptacle for various articles, which latter are easily accessible because of the structural nature and the position of the receptacle, in a comparatively short period of time and with little effort a convenient seat can be developed or produced from said receptacle, which seat can be as readily displaced and caused to disappear into the receptacle so as to be completely concealed from view.

A further object is to substitute, for the unsightly and uncomfortable " rumble " seat commonly employed in a certain type of automobile, a tastefully appearing trunk or what closely resembles a trunk and in great measure can be utilized as such, from which a large, comfortable, strong and shapely seat can be produced when needed, or which can be converted into such a seat without difficulty.

Other objects will appear in the course of the following description.

A preferred form of embodiment of the invention is illustrated in the accompanying drawings, and I will proceed to describe the invention with reference to the latter, although it is to be understood that the form, construction, arrangement, etc., of the parts in various aspects are not material and may be modified without departing from the spirit of the invention.

Figure 2:
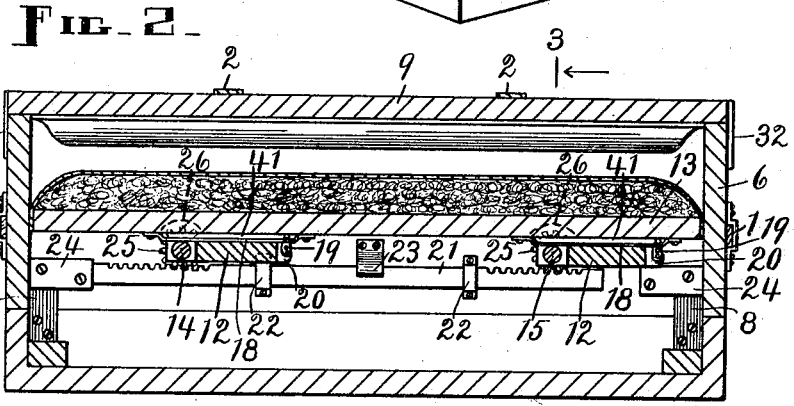
Figures 3, 4:
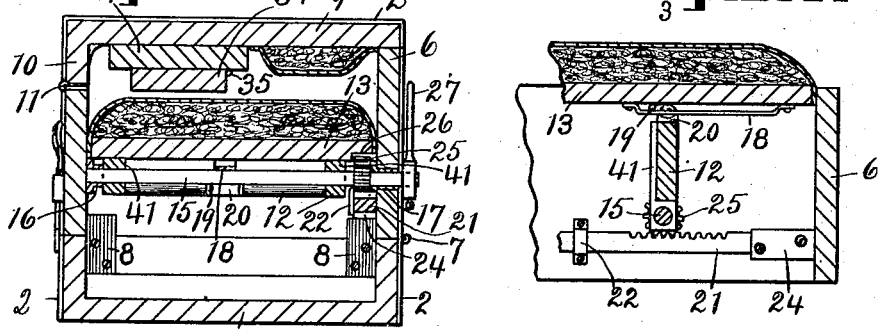
Figure 5:
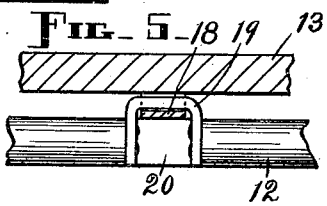

In the drawings, in which like numerals are employed to designate like parts throughout the same, Figure 1 is a perspective of the combined trunk and seat, only the trunk feature appearing; Fig. 2, a longitudinal vertical section through the combined trunk and seat, looking toward the front, the seat elements being depressed, folded, closed and inclosed, as in the first view; Fig. 3, a vertical cross-section taken on lines 3—3, looking in the direction of the associated arrow, in Fig. 2; Fig. 4, a detail in section of parts of the seat-operating mechanism, showing the seat proper in its elevated position; Fig. 5, an enlarged fragmentary detail of one of the seat links and its connections; Fig. 6, a front elevation of the combined trunk and seat, illustrative of the latter feature; Fig. 7, an end elevation of the parts and members as they appear in the preceding view, and, Fig. 8, an end elevation showing the trunk partially open.

In Fig. 6 a portion of the back of the seat is broken away to show one of the back-extension pins in full.

As already intimated, the box or chest which I use is preferably gotten up to resemble more or less closely a trunk, for the purpose of enhancing the appearance of the same and of the automobile which carries it, and to such end real or imitation handles, 1, straps, 2, corner protectors, 4, and other trappings and trimmings may be applied on the outside of such chest. These trappings and trimmings are merely incidental to my invention, and may, of course, be altered to any extent or omitted altogether.

The chest or trunk comprises a bottom section 5, which is intended to be rigidly fastened to the floor of an automobile at the back, and an upper section 6. The front side of the upper section 6 is hinged at 7 to the front side of the lower section 5, so that, by raising said upper section behind, as shown in Fig. 8, and opening the same to a sufficient extent, access is had to the space within the trunk which is below the seat-operating mechanism presently to be described. Corner posts 8 are provided in the bottom section to assist the hinges 7 in holding the upper section against endwise and lateral movement when closed, which they do because they project above the upper edges of said bottom section and then extend into said upper section. The upper section 6 has a top piece or lid 9 that is provided at its back edge with an angular extension 10, the back side and ends of said section being cut away to accommodate such extension when said lid is in place over said section. The extension 10 is hinged at 11 to the back side of the section 6. The top piece 9 constitutes a cover for and the actual top of the trunk, also the back of the seat, and the extension 10 is provided so that, when said top piece is swung upward on the hinges 11, into a vertical position, it is moved rearwardly for a distance equal to the breadth of said extension and increases the width of the seat approximately to that extent—see Fig. 7.

Adapted to fit within the top section 6 and supported by and on two oscillatory lifters 12 is a seat member 13, this being the seat proper of the combination. The lifters 12 are rigidly attached to or mounted on two shafts 14 and 15 which extend transversely of the section 6 and are journaled in bearings 16 and 17 secured to the front and back sides of said section. Two offset straps, keepers or bridge-pieces 18 are fastened to the underside of the seat 13 and extend longitudinally of such seat a little back of the longitudinal center of the same, and two links 19 connect the lifters 12 with said bridge pieces. Each link 19 is U-shaped and has it ends let into a recess 20, in the free longitudinal edge of one of the lifters 12, and fastened to the sides of such recess, while the middle portion of said link engages one of the bridge-pieces or keepers 18 and is adapted to slide in the space between the keeper and the seat 13. The recesses 20 in the free edges of the lifters accommodate the keepers or straps 18 and permit the said free edges directly to engage and support the seat. The purpose of the links 19 and the keepers 18 is to afford positive means for depressing the seat 13, in the event said seat fails to follow down on the lifters 12 when they are turned into the horizontal position, as will presently appear. The loops 19 extend laterally from the plane of the lifters 12 and flush with the free edges thereof, so that such edges can engage with the seat without the loops interfering, and by the loops extending laterally, they permit the lifters to drop to a horizontal position, as shown in Fig. 2. The shafts 14 and 15 on which the lifters are secured limit the downward movement of the seat, and hence the shafts form the seat rest, and furthermore the shafts support the weight in both its raised and lowered positions. It may be observed, in passing, that the seat 13 is loosely contained in the upper chest section and has no attachments except those afforded by the links and keepers.

A horizontal rack 21 is slidingly mounted against the front side of the section 6, inside of said section, in brackets 22—22 which are secured to said front side. A third bracket 23, also secured to the inner face of the front side of the section 6, may be provided to afford additional support for the rack 21 from above. Abutment blocks 24—24 are secured on the inside of the front of the section 6, in line with the rack 21, and arranged to limit the reciprocatory movement of said rack. Secured on the shafts 14 and 15 are two pinions 25 which mesh with the rack 21, the lifters 13 being cut away, if necessary, to accommodate said pinions, as shown at 26 in Fig. 3. The shaft 15 extends through the front side of the upper section and has a handle 27 rigidly attached to the protruding front terminal thereof.

The right block or stop 24, Figs. 2 and 4, is so positioned that when the rack bar 21 engages therewith, the upper or free edges of the lifters are vertically in line with the axes of the shafts 14 and 15, so that the seat will sustain the weight of a person without any tendency of its collapsing or dropping.

The arrangement of the parts is such that, when the lifters 12 are disposed horizontally, the seat 13 is in its low position in the trunk and at rest on the then upper sides of said lifters, and, when said lifters are disposed vertically, said seat is in its high position and at rest on the then upper edges of said lifters ready for use; furthermore, in the first instance the rack 21 is at one end of its travel against one of the abutments 24, and in the second instance said rack is at the other end of its travel against the other of said abutments. The lifters 12 are operated in unison by means of the handle 27 and through the medium of the shaft 15 and the pinion 25 thereon, the rack 21, the other pinion 25, and the shaft 14. When the lifters are thrown upward the free longitudinal edges thereof, which edges are preferably round, bear beneath the seat 13 and the latter rides on such edges until elevated to its high position on a level approximately with the upper edges of the section 6, the lifters then standing vertically, and the seat rides down on said edges in the same manner when the lifters are turned down again. The links 19 slide freely along the keepers 18, whenever the lifters are swung in either direction, but when said lifters are turned down said links carry the seat with them.

Having one end hinged at 28 to the top piece 9 adjacent to each end thereof is an arm 29. The opposite end of each arm 29 is provided with a post or stud 30 so located and arranged that it can enter and extend through an opening 31 in the upper part of a flat lug 32 secured to the adjacent end of the section 6, and be there secured by a cotter-pin 33 passed through an opening in the end of said stud that projects beyond said lug. The arms 29 are adapted either to fold against the front side of the top piece 9, when said top piece is in a vertical position, or to be opened outward and have their studs 30 engaged with the lugs 32 in the manner just explained. The strong and firm engagement thus afforded is responsible for maintaining the top piece in an upright position to form the back for the seat 13.

Each arm 29 is equipped with an arm-rest 34, which is hinged to such arm at 35—35, and with a supporting bracket 36 for such arm-rest, which bracket is mounted to swing in bearings 37 secured to said arm on the outside. These parts are so arranged that the arm-rests 34 can be swung into right-angular relation to the arms 29, and the brackets 36 swing into supporting relationship with said arm-rests, all as clearly shown in Figs. 6 and 7. Grooves 38 may be cut in each arm 29 to receive the bracket, with which said arm is provided, when said bracket is swung in against said arm at the time the seat-forming members are folded.

From the foregoing it is plain that the brackets 36 can be folded into the grooves 38 in the outer sides of the arms 29, swinging in their bearings 37, the arm-rests 34 turned down on their hinges 35 against the aforesaid outer sides of the arms, the latter swung inward on their hinges 28 against the top piece 9, and said top piece closed over the section 6, swinging on the hinges 11, with the collapsed or folded members within said section, provided the seat 13 be in the low position, such collapsed or folded members thus being stored, as it were, in the upper part of the trunk.

An extension 39 may be provided for the top piece 9, to increase the height of such top piece when in operative position as the back for the seat 13, and so enhance the comfort of the seat. The back extension 39 is preferably made in two or more parts so that it can be folded and packed away when not in use, either in the trunk or elsewhere; and said extension is provided with a plurality of bottom dowels or pins 40 that are received into suitable vertical openings in the upper edge of the back (top piece) 9, when said extension is in use, to retain the same in place on said back.

The top piece 9, seat 13, extension 39, and any other parts if deemed advisable, may be upholstered in any suitable manner. Wherever upholstery appears in the drawings it is to be considered as forming a part of the member with which it is united.

In practice, the trunk is converted into the seat by opening or raising the top piece or lid 9 to form the back, opening out the arms 29 and fastening them to the lugs 32, swinging the arm-rests 34 into horizontal position and securing them in such position by means of the brackets 36, and, at this or any time after raising said top piece, turning the handle 27, from the vertical position which it occupies in Fig. 3 to the horizontal position which it occupies in Figs. 6 and 7, to elevate the seat 13 by means of the intervening mechanism. If the extension 39 is required, it is now mounted on the member 9.

To restore the parts to their former positions and conditions or to convert the seat into the trunk, turn up the handle 27 again and so depress the seat 13, lift off the extension 39, provided the same be used, fold the brackets 36 and the arm-rests 34, unfasten the arms 29 and fold them also, and close the top piece or lid 9. The transforming or converting operations are very simple and can be easily and quickly performed.

The straps 2 do not extend across the juncture at the back of the trunk between the sections 5 and 6, nor across the juncture at the front between the section 6 and the top piece 9, consequently do not interfere with opening the trunk to get at the interior of the same below the seat 13 and the operating mechanism therefor, nor with raising the top piece. The section 6 can be opened on the hinges 7 when the seat-forming members are in operative position as well as when they are inoperatively disposed. The lifters 12 have transverse grooves 41 in them to receive the keepers 18 when the seat 13 is resting on the contiguous sides of said lifters.

Not only may the extension 39 be omitted altogether, but the arm-rests and the brackets therefor as well, and the combination would be quite serviceable even without the arms, all of these members, however, and more especially the arms and arm-rests, render the seat much more comfortable and convenient than would be the case in their absence.

What I claim as my invention, and desire to secure by Letters Patent, is—

1. The combination of a body; an endwise movable bar arranged longitudinally within said body and supported against one wall thereof, said bar being provided upon its upper face with two sets of rack teeth; a pair of transversely-arranged horizontal shafts journaled in said body and projecting at one end above and across said sets of teeth; a pinion secured to each shaft and meshing with the adjacent set of teeth; a laterally-disposed lifter secured at its inner end to the central portion of each shaft; a vertically-movable seat disposed within said body above the plane of said shafts; a pair of longitudinal keepers secured to the under face of said seat directly above said lifters and in endwise alinement with each other, the free outer ends of said lifters being slidably connected with said keepers; and an operating element secured to one end of one of said shafts.

2. The combination of a body; an endwise-movable bar arranged longitudinally within said body, and supported against one wall thereof, said bar being provided upon its upper face with two sets of rack teeth; stops secured to said wall in alinement with said bar and adjacent to the opposite ends thereof, to limit the movements of the bar in opposite directions; a pair of transversely-arranged horizontal shafts journaled in said body and projecting at one end above and across said sets of teeth; a pinion secured to each shaft and meshing with the adjacent set of teeth; a laterally-disposed lifter secured at its inner end to the central portion of each shaft and having a recessed outer end and a longitudinally-grooved face; a vertically-movable seat disposed within said body above the plane of said shafts; a pair of longitudinal keepers secured to the under face of said seat directly above said lifters and in endwise alinement with each other; a link mounted in the recess in the outer end of each lifter and slidingly engaged with the adjacent keeper, said keepers being adapted to enter the grooves in said lifters when said seat is in its normal lowered position; and an operating element secured to one end of one of said shafts.

HUGH McLEOD.

Witnesses:
F. A. CUTTER,
A. C. FAIRBANKS.

Copies of this patent may be obtained for five cents each, by addressing the "Commissioner of Patents, Washington, D. C."